(12) United States Patent
Hasholt

(10) Patent No.: US 9,926,041 B2
(45) Date of Patent: Mar. 27, 2018

(54) BULBOUS BOW, A SEA-GOING VESSEL WITH SUCH BOW, AND METHODS OF ITS MANUFACTURE

(71) Applicant: Steen Hasholt, Allerød (DK)

(72) Inventor: Steen Hasholt, Allerød (DK)

(73) Assignee: OSK-Shiptech A/S, Aarhus C (DK)

( * ) Notice: Subject to any disclaimer, the term of this patent is extended or adjusted under 35 U.S.C. 154(b) by 0 days.

(21) Appl. No.: 15/281,932

(22) Filed: Sep. 30, 2016

(65) Prior Publication Data

US 2017/0096191 A1    Apr. 6, 2017

(30) Foreign Application Priority Data

Oct. 2, 2015  (DK) .................................. 2015 70622

(51) Int. Cl.
| | |
|---|---|
| B63B 1/06 | (2006.01) |
| B63B 3/09 | (2006.01) |
| B63B 5/14 | (2006.01) |
| B63B 5/24 | (2006.01) |
| B63B 3/16 | (2006.01) |
| B63B 9/00 | (2006.01) |

(52) U.S. Cl.
CPC ............... B63B 1/063 (2013.01); B63B 3/09 (2013.01); B63B 3/16 (2013.01); B63B 5/14 (2013.01); B63B 5/24 (2013.01); *B63B 2009/008* (2013.01)

(58) Field of Classification Search
CPC .... B63B 1/00; B63B 1/04; B63B 1/06; B63B 1/063; B63B 1/08; B63B 59/00; B63B 59/02; B63B 3/09; B63B 3/16; B63B 5/14; B63B 5/24

USPC ............................................. 114/61.27, 61.28
See application file for complete search history.

(56) References Cited

U.S. PATENT DOCUMENTS

| | | | | |
|---|---|---|---|---|
| 3,455,262 | A | * | 7/1969 | Weicker .................. B63B 1/063 114/61.28 |
| 3,745,960 | A | * | 7/1973 | Devine .................. B08B 9/0936 114/74 R |
| 4,323,026 | A | | 4/1982 | Gallagher |
| 4,550,673 | A | * | 11/1985 | Ingvason ................ B63B 1/063 114/61.28 |

(Continued)

FOREIGN PATENT DOCUMENTS

| | | |
|---|---|---|
| DE | 2024647 A1 | 12/1971 |
| DE | 8713889.1 | 12/1987 |
| FR | 2067945 A5 | 8/1971 |

(Continued)

OTHER PUBLICATIONS

Machine Translation of DE2024647.
Machine Translation of DE8713889.1.
Machine Translation of FR2067945.

*Primary Examiner* — Lars A Olson
(74) *Attorney, Agent, or Firm* — Dinsmore & Shohl LLP

(57) ABSTRACT

The present invention concerns a bulbous bow for a seagoing vessel, said bow comprising a load-carrying inner structure mounted at the stem of the vessel and an outer shell structure defining the hydrodynamic properties of the bulbous bow, wherein said outer shell structure is provided with a sub-structure for replaceably mounting on the inner structure. The invention further concerns a seagoing vessel comprising such bulbous bow as well as a method of producing a bulbous bow and a method of mounting or replacing a bulbous bow.

21 Claims, 7 Drawing Sheets

(56) References Cited

U.S. PATENT DOCUMENTS 5,598,802 A * 2/1997 Ramde .................... B63B 1/04
                                                    114/61.28

FOREIGN PATENT DOCUMENTS

| FR | 2822797 A1 | 10/2002 |
|----|------------|---------|
| GB | 1112216 | 5/1968 |
| GB | 1316287 | 5/1973 |
| JP | S 5215076 | 2/1977 |
| JP | 2015517951 A | 6/2015 |
| WO | WO-2004092004 A1 | 10/2004 |

* cited by examiner

BULBOUS BOW, A SEA-GOING VESSEL WITH SUCH BOW, AND METHODS OF ITS MANUFACTURE

CROSS-REFERENCE TO RELATED APPLICATIONS

This application is claims priority to international patent application No. PA 2015 70622, filed Oct. 2, 2015, the entire content of which is incorporated herein in its entirety.

FIELD OF THE INVENTION

The present invention relates to a sea-going vessel with a bulbous bow.

BACKGROUND OF THE INVENTION

A bulbous bow is used on sea-going vessels in order to enable a better hydrodynamic engagement with the water, lowering the overall resistance of the vessel when traveling through said water. The bulbous bow design has been around for decades, and is a very widely used and recognized solution for breaking the water in an optimal way for larger vessels, lowering the overall resistance of said vessel, allowing for a smaller propulsion system, thereby reducing the consumption of fuel.

In FR2822797A1 there is disclosed a solution for collisions and other types of damage to a bulbous bow, by designing a bulbous bow with a spring mechanism inside to absorb any damage to the bow coming from the front of the bow, and enabling the whole bulbous bow to detach from the hull of the vessel. The design is very simple and straight forward, but raises manufacturing costs rather than lowering them, by making the bulbous bow more complex, while maintaining the double curved surfaces in the design. The detachable and replaceable bulbous bow is a heavy and complicated procedure, and will still be costly.

JP2015517951A discloses a manufacturing and attachment method for manufacturing a bulbous bow in a high strength weldable material, such as steel, and welding it onto a hull, as well as a subsequent inspection of the weldings. This is a new take on the traditional way of manufacturing and attaching bulbous bows to hulls, and describes the difficulty and problems of welding and checking the tightness of the assembly.

U.S. Pat. No. 4,323,026A describes a fluid based collision dampening design of a bulbous bow. The bulbous bow is filled with a fluid, which when the bow collides with another object, will minimize the damage to the hull of the vessel by draining the fluid of the bulbous bow into a cavity in a controlled manner. This minimizes damage to the main hull of the vessel as well as the damage to whatever is collided with, but does not lower the manufacturing costs of the bulbous bow, on the contrary the solution adds complexity to the construction, adding manufacturing costs.

WO2004092004A1 describes a bow of a vessel designed to bend away in case of collision, minimizing damage to the vessel as well as whatever it collides with. The bow is manufactured in the traditional manner, double curved steel plates and underlying structure, making the design more expensive as it adds complexity.

Traditionally the bulbous bow is manufactured in metal which is cut and hammered out into double curved surfaces, which is a very difficult and expensive process.

SUMMARY OF THE INVENTION

Accordingly, it is an object for the present invention to provide a simpler and inexpensive bulbous bow for a sea-going vessel in order to improve the above-mentioned deficiencies in the known bulbous bow designs.

By the present invention there is provided a solution for manufacturing such double curved surfaces in a more efficient and cheaper way, e.g. by the use of rapid prototyping for the outer surfaces, coupled with an inner structure securing the shape, stability and strength of the outer shell, using welded frames, foam layers, and/or other solutions. Accordingly, there is provided for a vessel with a bulbous bow, which is easily replaceable, which in turns provides for the possibility of optimizing the vessel depending on the draught of the vessel, i.e. depending on its load, by replacing the bulbous bow with an another bow with a different shape. By manufacturing the complex geometries of the parts for the bulbous bow, including the double curved surfaces by using 3d printing techniques or rapid prototyping there is provided a more efficient and less expensive method of producing the bulbous bow.

As a bulbous bow according to the invention is provided in modules, such as the outer shell comprising a number of sub-structure elements and an outer shell structure, such as outer shell, coupled with an inner structure securing the shape, stability and strength of the outer shell, using welded frames, foam layers, and/or other solutions.

By the invention a rapid manufacturing processing, such as 3d printing, is used to reduce the manufacturing costs of the traditional bulbous bows, whilst also achieving significant other gains in relation to traditional issues with the bulbous bows. By manufacturing the bulbous bow in a more modularized way, allowed by the use of the rapid manufacturing processes for the outer layer, the resulting solution enables further gains than reducing manufacturing costs, such as interchangeable outer shell structure in relation to optimal hydrodynamic breaking of waves, interchangeable/replaceable parts due to wear and/or collisions, and after-market upgrading of existing vessels manufactured with or without this solution from shipyard.

One aspect of the invention using rapid manufacturing processes, such as 3d-printing, is enabling the interchangeability of the shell of the bulbous bow. This allows for a more optimal hydrodynamic travel through the water, as the hydrodynamic profile can be changed to fit fully loaded and empty vessels. The draught of the vessel and thereby also the optimal bulbous bow also depends on the speed at which it travels. An estimate of the gain from changing the hydrodynamic profile of a large load carrying cargo vessel, is a reduction of 4% per ship, which represents significant savings in fuel for the operators of such sea-going vessels.

Another advantage of the invention is that the invention enables the exchange of a limited number of parts in case of wear and/or collisions. As the bulbous bow protrudes in front of the vessel, it is vulnerable to groundings and collisions and hence in such cases often will need repair or replacement. Manufacturing the bulbous bow as a modularized solution allows for exchange of the dome-shaped outer shell due to wear and/or collisions, and the outer shell structure which can be designed as a collapsible structure, in case of collisions, without needing to repair the hull of the vessel. This solution enables the repair and exchange of these parts to take place while at sea, removing the need and costs of having to dock the vessel for repairs. This also amount to a significant saving for the operators of the vessel both with regard to savings on the repair itself, as well as on the docking time required for the repairs. The repairs or replacement may be carried out by divers with the use of and onboard crane for the heavier absorption structure.

The invention has another benefit, allowing for continuous upgrading of vessels with new shells for vessels in use, upgrading the hydrodynamic design for new implementations of the vessel, and or for upgrading robustness for new implementations. Furthermore the solutions enable aftermarket fitting of the solution to existing vessel, as an aftermarket upgrade. This enables companies to enter or create another market, as the rapid manufacturing process allows for adapting the designs to almost all existing vessels.

BRIEF DESCRIPTION OF THE DRAWINGS

In the following the invention is described in more detail with reference to the accompanying drawings, in which.

DETAILED DESCRIPTION OF THE INVENTION

Figure 1:
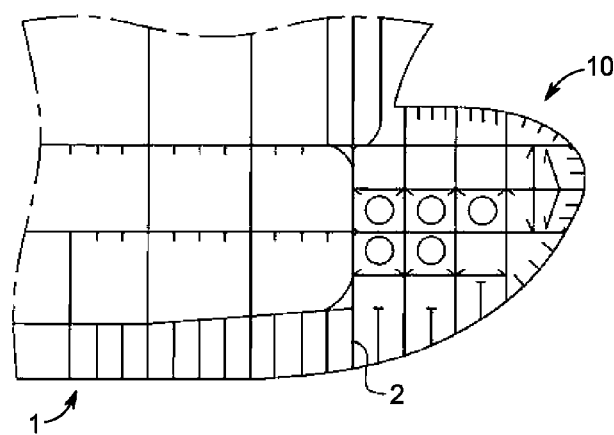
FIG. 1 is a schematic cross-sectional view of a bulbous bow according to the prior art.

In FIG. 1 is shown a traditional structure of a sea-going vessel 1 with a bulbous bow 10 in its stem. The bow 10 is integrally built with the structure of the vessel 1.

Figure 2:
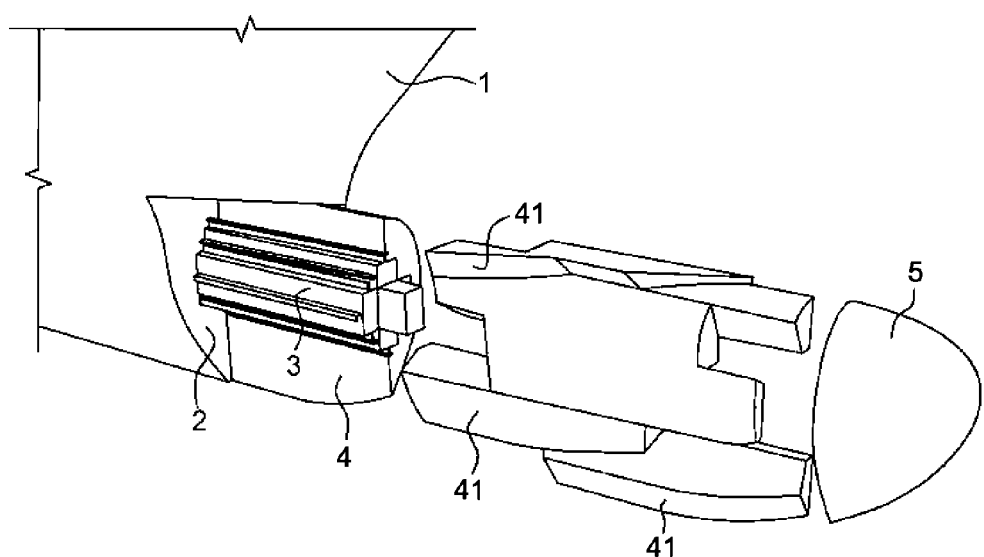
FIG. 2 is a perspective view of the stem of a ship fitted with a bulbous bow according to a first embodiment of the invention.

Instead of designing the sea-going vessel with bulbous bow as shown in FIG. 1, it is advantageously found that the vessel can be designed as shown in FIG. 2, which shows a first embodiment of the present invention. The vessel 1 is provided with a bulkhead 2 in which a mounting structure 3 is provided. The mounting structure 3 may be a protruding member as shown in FIG. 2 which is designed and dimensioned to withstand the forces which the bow is subjected to during use. Onto this mounting structure 3 an outer shell structure 4 and 5 is provided forming the bulbous bow. This outer shell structure is defining the hydrodynamic shape of the bulbous bow which when mounted is flush with the surface of the vessel hull. The outer shell structure 4 is built by modular sections, whereas the starboard side is shown disassembled. This outer shell structure 4 is made of a number of modular sections 41 which are assembled to each other and is mounted around the protruding mounting member 3. The dome-shaped outer shell 5 is then mounted in front of the modular sections 41. This bulbous bow assembly is assembled using appropriate assembly techniques so that the parts may easily be disassembled again. Such techniques may include welding, adhesive, fasteners, such as screws, nuts and bolts and/or rivets or combinations thereof.

The modular sections 41 are preferably made of an energy absorbent material, such as foam or the like which can absorb most impact that the bulbous bow may be subjected to.

Figure 3:
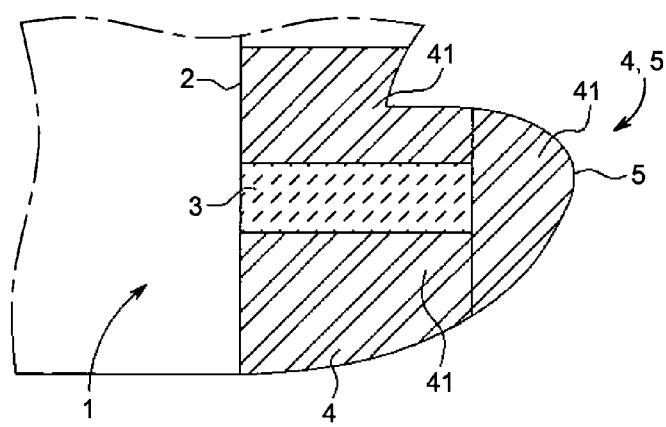
FIG. 3 is a schematic cross-sectional side view of a bulbous bow according to a second embodiment of the invention.
Figure 4:
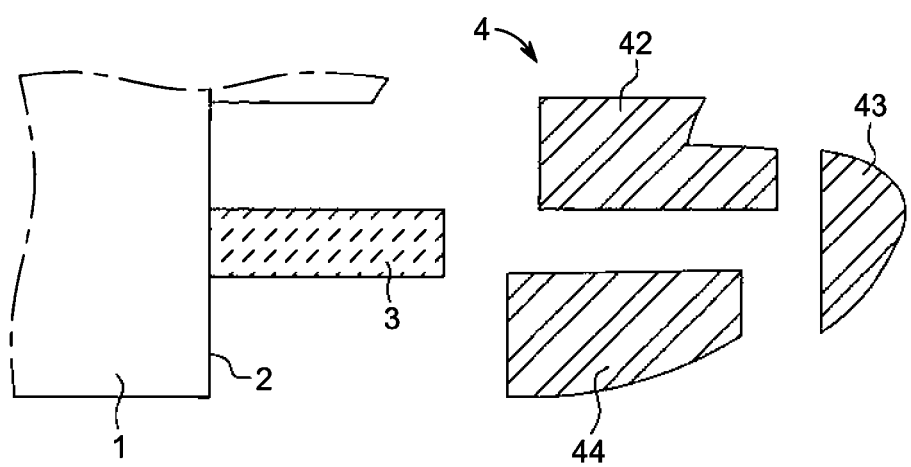
FIG. 4 is an exploded view of the bulbous bow in FIG. 3.
Figure 5A:
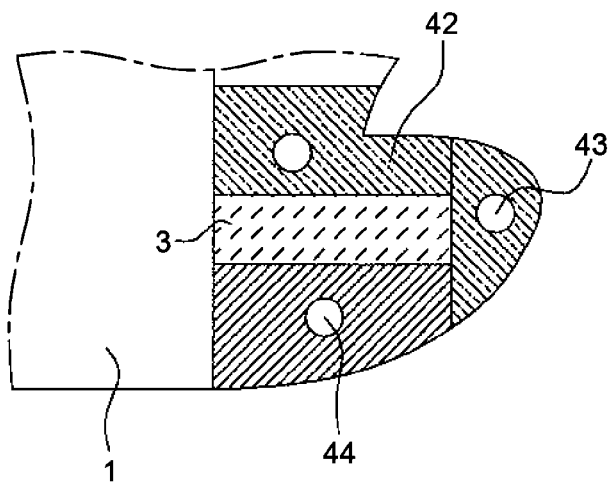
FIGS. 5 a)-c) show three bulbous bows made up by modules optimized for various vessel draughts.
Figure 5B:
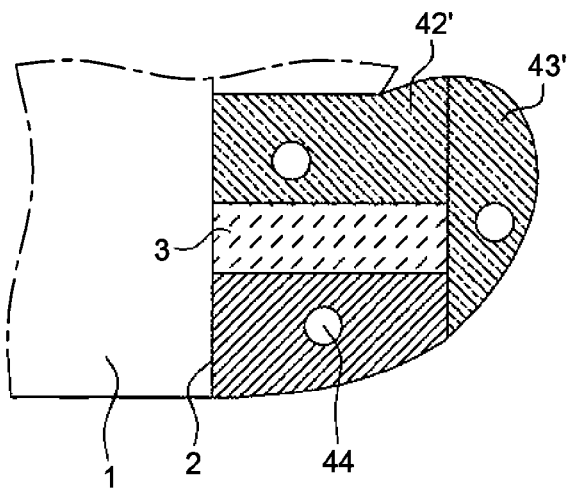
Figure 5C:
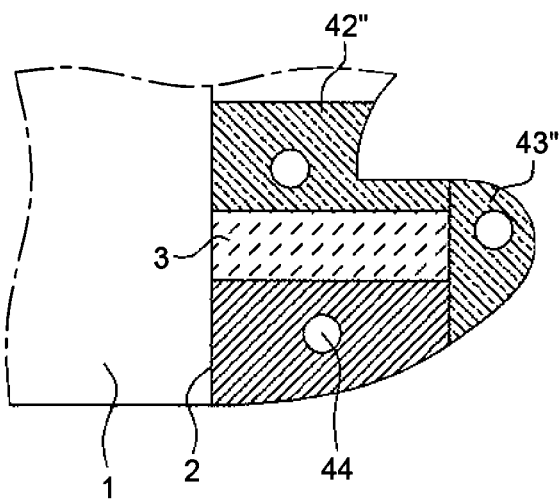

In FIG. 3 a second embodiment of the invention is shown. In this embodiment, the modular sections 41 make up the outer shell structure 4, 5. The modular sections 41 when assembled around the mounting structure 3 also define the outer surface and thereby the hydrodynamic a shape of the bulbous bow. In FIG. 4, an exploded view of the embodiment of FIG. 3 is shown. As an example the modular assembly of the bulbous bow may comprise three modules 42, 43, 44. It is realised that the number may be varied depending on the specific preferences. However, as further shown in FIG. 5, one or more of the modules may be reused in different configurations of the bulbous bow. As an example three different shapes of the bow are shown in the FIGS. 5a), 5b) and 5c). Common for these three examples is the bottom module 44, whereas the top module 42 and the front module 43 are changed whereby the shape of the bulbous bow can easily by changed, when the vessel is moored at a quay for loading or unloading, or under favourable conditions even when it is at sea, so that the bulbous bow stem may be altered for optimal performance of the sea-going vessel depending on its actual cargo load.

Figure 6:
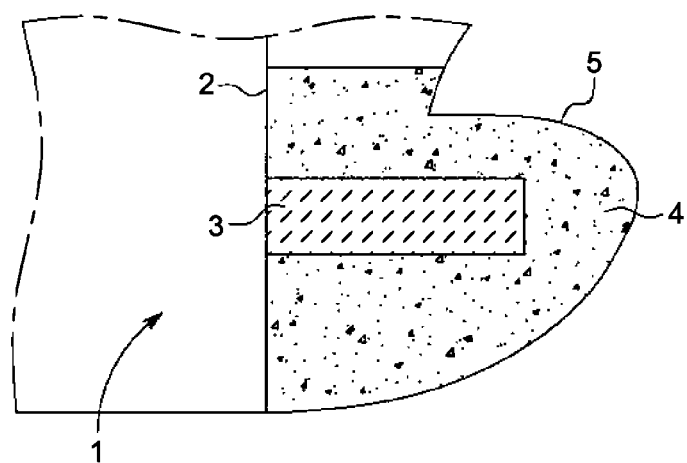
FIG. 6 is a schematic cross-sectional side view of a bulbous bow according to a third embodiment of the invention.

A third embodiment of the invention is schematically shown in FIG. 6. There the vessel 1 is fitted with a modularised bulbous bow in front of the bulkhead 2. The modularised bulbous bow assembly includes a forwardly protruding mounting member 3, a thin outer shell 5 which is provided with an inner structure 4 made of a foam. The thin outer shell 5 may be adhesively secured to the foam structure 4, which in turn by adhesives and/or mechanical mounting means is secured to the mounting member 3.

Figure 7:
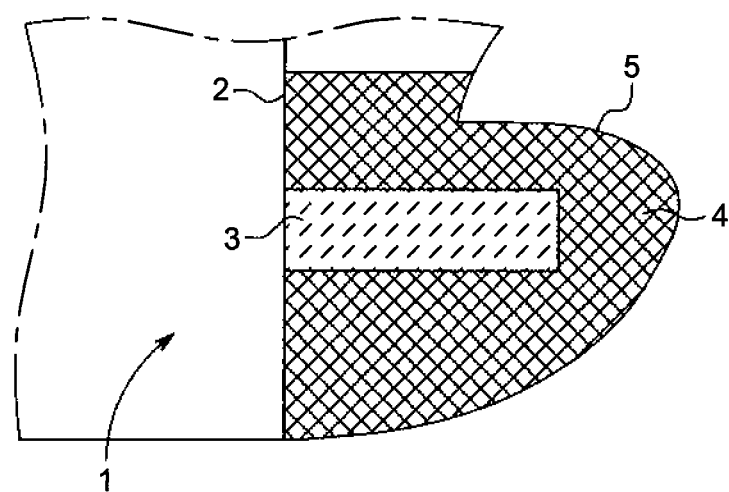
FIG. 7 is a schematic cross-sectional side view of a bulbous bow according to a fourth embodiment of the invention.

In a fourth embodiment of the invention schematically shown in FIG. 7, the vessel 1 is fitted with a modularised bulbous bow in front of the bulkhead 2, where the modularised bulbous bow assembly includes a forwardly protruding mounting member 3, a thin outer shell 5 which is provided with an inner structure 4 made of a 3D wire mesh. The thin outer shell 5 may be secured to the wire mesh structure 4 by welding, and/or mechanical fasteners or the like, which in turn by adhesives, welding and/or mechanical mounting means is secured to the mounting member 3.

Above the invention is explained with reference to some currently preferred embodiments. However, it is realised that variant may also be provided without departing from the accompanying claims. For instance, in the above examples, the mounting structure 3 is shown to be a protruding member extending from the bulkhead 2 towards the front of the vessel. However, it is realised that the mounting could alternatively be in the form of an opening into the vessel and the modular bulbous bow assembly according to the invention would then be fitted with a mounting member protruding into the bulkhead and into a receiving slot from in the bulkhead 2 and/or vessel structure.

The invention claimed is:

1. A bulbous bow assembly for a sea-going vessel, said bulbous bow assembly comprising:
    a load-carrying inner structure mountable at a stem of the sea-going vessel, the load-carrying inner structure having a protruding member adapted to be mounted on a bulkhead of the sea-going vessel; and
    an outer shell structure defining the hydrodynamic properties of the bulbous bow assembly, wherein said outer shell structure is provided with a sub-structure for replaceably mounting on the load-carrying inner structure, said outer shell structure being received on said protruding member.

2. A bulbous bow assembly according to claim 1, wherein the outer shell structure comprises a dome-shaped outer shell, which is provided in a pre-determined hydrodynamically designed form.

3. A bulbous bow assembly according to claim 1, wherein the sub-structure comprises at least one load absorbing element, which is mounted to the load carrying inner structure.

4. A bulbous bow assembly according to claim 1, wherein the outer shell structure is made using rapid prototyping or 3d printing.

5. A bulbous bow assembly according to claim 1, wherein the outer shell structure is made of plastic.

6. A bulbous bow assembly according to claim 1, wherein the outer shell structure is made of metal or steel.

7. A bulbous bow assembly according to claim 1, wherein the outer shell structure is made of concrete.

8. A bulbous bow assembly according to claim 1, wherein the sub-structure of the outer shell structure is made of foam.

9. A bulbous bow assembly according to claim 1, wherein the sub-structure of the outer shell structure is made as a frame or mesh.

10. A bulbous bow assembly according to claim 1, wherein the sub-structure of the outer shell structure is made of concrete.

11. A bulbous bow assembly according to claim 1, wherein the bulbous bow assembly is partly or fully replaceable.

12. A bulbous bow assembly according to claim 1, wherein the bulbous bow assembly is provided as modules that may be assembled and disassembled.

13. A bulbous bow assembly according to claim 1, wherein the outer shell structure and the load carrying inner structure are vertically displaceable.

14. A seagoing vessel comprising a bulbous bow assembly according to claim 1.

15. A method of producing a bulbous bow assembly for a sea-going vessel:
said bulbous bow assembly comprising:
a load-carrying inner structure mountable at a stem of the sea-going vessel, the load-carrying inner structure having a protruding member adapted to be mounted on a bulkhead of the sea-going vessel; and
an outer shell structure defining the hydrodynamic properties of the bulbous bow assembly, wherein said outer shell structure is provided with a sub-structure for replaceable mounting on the load-carrying inner structure, said outer shell structure being received on said protruding member:
the method comprising manufacturing at least the outer shell structure using rapid prototyping by means of 3d printing.

16. A method of mounting or replacing a bulbous bow assembly comprising:
providing a bulbous bow assembly comprising:
a load-carrying inner structure mountable at a stem of the sea-going vessel; and
an outer shell structure defining the hydrodynamic properties of the bulbous bow assembly, said outer shell structure provided with a plurality of modular sections including an outer shell and a sub-structure for replaceably mounting on the load-carrying inner structure;
storing at least part of the outer shell structure on-board the vessel; and
lowering at least one part of the outer shell structure into the sea for mounting on the vessel.

17. The method of mounting or replacing a bulbous bow assembly of claim 16, further comprising:
providing one or more cranes and using said one or more cranes for the mounting or replacing of the bulbous bow assembly.

18. The method of mounting or replacing a bulbous bow assembly of claim 16, wherein said mounting or replacing includes the use of floatation chambers.

19. The method of mounting or replacing a bulbous bow assembly of claim 16, wherein said mounting or replacing includes the use of one or more divers.

20. A bulbous bow assembly for a sea-going vessel, said bulbous bow assembly comprising:
a load-carrying inner structure mountable at a stem of the sea-going vessel, the load-carrying inner structure having a protruding member adapted to be mounted on a bulkhead of the sea-going vessel; and
an outer shell structure defining the hydrodynamic properties of the bulbous bow assembly, wherein said outer shell structure is provided with a plurality of modular sections including an outer shell and a sub-structure for replaceably mounting on the load-carrying inner structure, said outer shell structure being received on said protruding member.

21. A bulbous bow assembly according to claim 20, wherein the plurality of modular sections are shape stable.

* * * * *